United States Patent [19]

Bodine et al.

[11] Patent Number: 4,628,491
[45] Date of Patent: Dec. 9, 1986

[54] TIME VARIANT FILTER FOR RANGE DEPENDENT TUNING

[75] Inventors: John H. Bodine; Jonathan Bork, both of Tulsa, Okla.

[73] Assignee: Standard Oil Company, Chicago, Ill.

[21] Appl. No.: 595,119

[22] Filed: Mar. 30, 1984

[51] Int. Cl.$^4$ .............................................. G01V 1/36
[52] U.S. Cl. ....................................... 367/45; 367/43; 367/47; 364/421
[58] Field of Search ........................ 367/45, 43, 44, 56, 367/46, 47, 49, 51, 52; 343/5 SM, 7.7, 5 DP; 364/421, 724

[56] References Cited

U.S. PATENT DOCUMENTS

| | | | |
|---|---|---|---|
| 2,716,733 | 8/1955 | Roark | 367/45 |
| 3,421,141 | 1/1969 | Meyerhoff | 367/45 |
| 3,806,929 | 4/1974 | Moore | 343/5 SA |
| 4,034,373 | 7/1977 | de Pierre et al. | 343/7.7 |
| 4,209,854 | 6/1980 | Ruehle | 367/43 |
| 4,375,640 | 3/1983 | Harvey | 343/7.7 |

OTHER PUBLICATIONS

"The Digital Processing of Seismic Data", Silverman Daniel, Geophysics, vol. 32, #6, 12/67, p. 988.
"The Limits of Resolution of Zero Phase Wavelets", Kallweit et al., Geophysics, vol. 47, 1982, p. 1035.

Primary Examiner—Thomas H. Tarcza
Assistant Examiner—Ian J. Lobo
Attorney, Agent, or Firm—Timothy D. Stanley

[57] ABSTRACT

A method and apparatus for enhancing the resolution of true variations of a seismic signal amplitude as a function of range. A time-variant bandpass filter is impressed upon the seismic data having a bandpass frequency dependent upon the range between the seismic sources and the seismic receivers of a common depth point array of seismic sources and seismic receivers. A maximum bandpass frequency is derived from the maximum range between the seismic sources and the seismic receivers of a common depth point array of seismic sources and seismic receivers. The maximum bandpass frequency is adapted to accommodate time varying ranges as well as time varying stacking velocities so as to produce a seismic signal having enhanced resolution of amplitude variations of the seismic signal.

20 Claims, 9 Drawing Figures

Range Dependent Tuning Effects
With NMO Corrections

TIME VARIANT FILTER FOR RANGE DEPENDENT TUNING

BACKGROUND OF THE INVENTION

The present invention generally relates to the field of seismology and, in particular, to an apparatus and method for processing of seismic reflection data to diminish range dependent tuning effects and enhancing the resolution of true variations of a seismic signal amplitude as a function of range in unstacked common depth point gathers.

As the seismic exploration technology has advanced, the range or separation between seismic sources and seismic receivers has increased. However, at increased ranges due to the convergence of normal moveout curves, the ability to resolve thin subterranean formation tends to be masked by seismic reflection data as a function of range. Specifically, the difference in the length of the seismic signal ray path from the upper and lower surfaces of a thin subterranean formation decreases as the range between a seismic source and a seismic receiver increases. Consequently, a plot of the differences in the arrival times of seismic reflections from these surfaces diminishes as the range increases so as to merge the reflections into a single event. In addition to the merging of seismic events, spurious amplitude variations as a function of range due to the apparent thinning of the seismic event are observed. Such effects are undesirable and detrimental to a correct analysis of range dependent amplitude variations in a seismic signal representing the seismic reflection.

This problem is not improved by conventional processing to correct for normal moveout (NMO) of the seismic signal from the seismic source. In the process of correcting for NMO, stretching of the far range seismic signals occurs. The result is a lowering of the frequency content in the stretched data from the original bandpass; however, resolution is not improved by NMO. The decreasing difference in arrival times with increasing range for thin bed reflections is simply transformed by NMO into a decreasing frequency content with increasing range. As such, true amplitude variations of the seismic signal as a function of range cannot be correctly ascertained due to tuning effects from the differential thinning of seismic events.

SUMMARY OF THE INVENTION

In the process of detecting and receiving seismic data for increasing ranges between a seismic source and a seismic receiver, a need has arisen to reduce the range dependent tuning effects on such seismic data in a fashion that is dependent upon the distance between the seismic source and the seismic receiver so as to balance the frequency content of the near and far range unstacked common depth point gathers of the seismic data. The present invention discloses a method and apparatus for diminishing range dependent tuning effects and enhancing the resolution of true variations of the seismic signal amplitude as a function of range in unstacked common depth point gathers.

The apparatus of the present invention receives seismic signals generated by a plurality of seismic sources and seismic receivers spaced along the earth's surface as well as tape header data specifying the range between each seismic source and seismic receiver in a common depth point array of seismic sources and seismic receivers. A computing unit within the apparatus sorts the seismic response data into common depth point gathers of seismic signals, processes the header information and calculates a bandpass frequency as a function of the range for each common depth point array of seismic sources and seismic receivers. A selectable bandpass filter having a bandpass frequency determined by the computing unit impresses the selected bandpass frequency upon each common depth point gather of the seismic response data so as to diminish range dependent tuning effects in the unstacked common depth point gathers. A plotter outputs the filtered seismic signals data for visual interpretation as a seismic trace.

In operation, seismic response data is acquired from seismic signals generated by a plurality of seismic sources and seismic receivers spaced in an array over a horizontal extent having at least one dimension. Header data specifying the range or separation between each seismic source and each seismic receiver of a common depth point array of seismic sources and seismic receivers are collected. The seismic response data is sorted into unstacked common depth point gathers of seismic signals. A bandpass filter is impressed upon the seismic signal from each seismic receiver having a bandpass frequency dependent upon the range of the seismic receiver from the seismic source initiating the seismic signal to correct for range dependent tuning effects. The filtered seismic signals are then plotted as a seismic trace for examination by a seismologist.

In the same time-variant manner that stretching is introduced by normal moveout (NMO) corrections which thus reduces the frequency content of far range data, the bandpass filter of the present invention balances the frequency resolution of the near range seismic data to that of the far range seismic data of each unstacked common depth point gather. Thus, a seismologist is able to correctly resolve and characterize true variations in amplitude of the seismic signal as a function of range.

This summary is not intended to be all inclusive of the features of the present invention as will become apparent to those skilled in the art once having read the complete disclosure. Nor is this summary intended to impose any limitations upon the scope of the claims presented herewith.

DESCRIPTION OF THE PREFERRED EMBODIMENT

As a preliminary matter, a brief description of the reduction in the frequency content and the merging of signal wavelets as a function of increasing range between a seismic source and seismic receiver is provided.

Figure 1A:
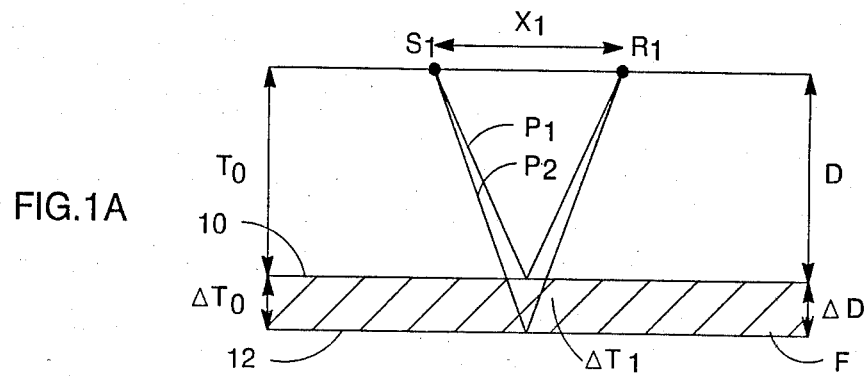
FIGS. 1A, B and C are schematic representations of a seismic ray path as it impinges upon and is reflected by a thin subterranean formation for increasing ranges between seismic sources and seismic receivers of a common depth point array of seismic sources and seismic receivers.
Figure 1B:
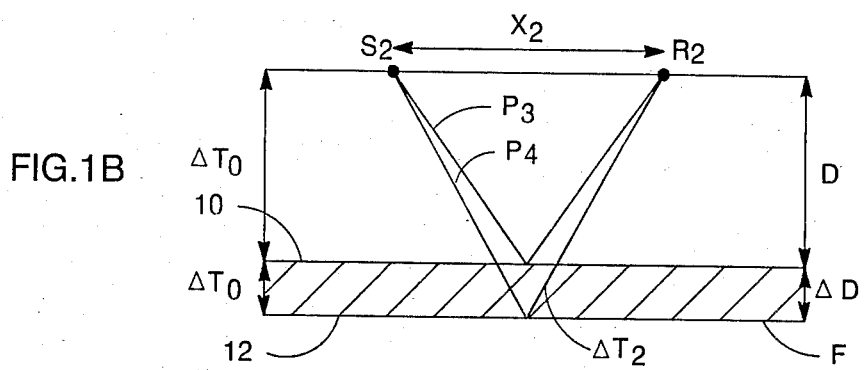
Figure 1C:
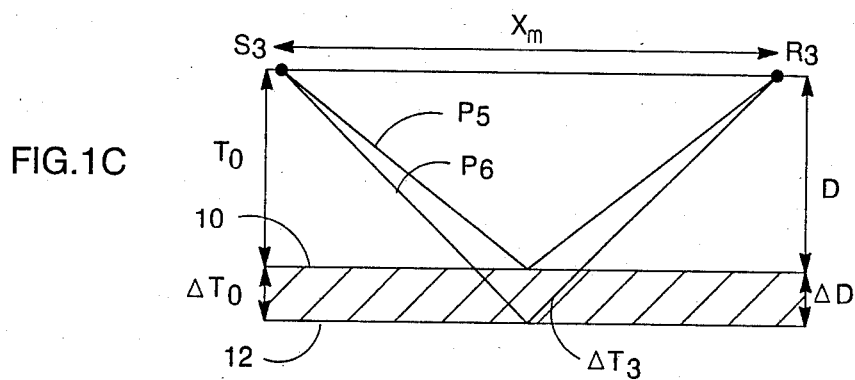
Figure 2:
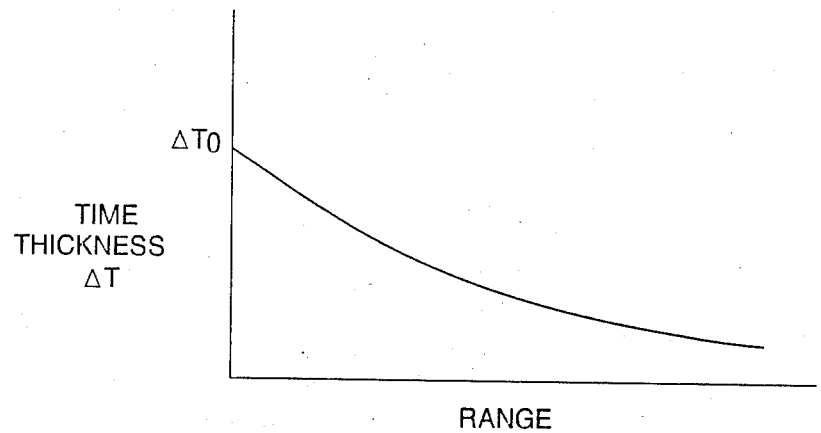
FIG. 2 is a schematic representation showing the decrease in the difference in travel time of a seismic ray reflected from the upper and a lower surface of a thin subterranean formation as the range between the seismic source and the seismic receiver increases.

Looking first at FIGS. 1 and 2, the effect of increasing the range between a seismic source S and a seismic receiver R on a seismic ray path P for a common depth point array of seismic sources S and seismic receivers R is shown. More particularly, FIG. 1A shows a seismic ray path $P_1$ emanating from the source $S_1$ and reflecting from an upper surface 10 of a thin subterranean formation F a vertical two-way time separation from the surface of $T_0$ and having a vertical two-way time extent $\Delta T_0$. The subterranean formation F is a vertical distance D from the surface and has a vertical extent of $\Delta D$. Additionally, a second seismic ray path $P_2$, similarly emanating from the source $S_1$ and reflecting from a lower surface 12 of the subterranean formation F, is shown in FIG. 1A. Both seismic rays following paths $P_1$ and $P_2$ are received by seismic receiver $R_1$ which is a fixed distance $X_1$ from the seismic source $S_1$. The difference in arrival times of the seismic rays following paths $P_1$ and $P_2$ at seismic receiver $R_1$ is $\Delta T_1$. The example provided above and shown in FIGS. 1A–C is typical for a common depth point (CDP) array of seismic sources S and seismic receivers R.

Similarly, FIG. 1B shows a seismic ray path $P_3$ emanating from source $S_2$ and reflecting from the upper surface 10 of the thin subterranean formation F and a seismic ray path $P_4$ emanating from the seismic source $S_2$ and reflecting from the lower surface 12 of the subterranean formation F, both of which intersect and are received by seismic receiver $R_2$ which is spaced a fixed distance $X_2$, which is greater than $X_1$, from seismic source $S_2$. It should be noted that the subterranean formation F is at the same fixed distance D beneath the surface as that shown in FIG. 1A. The difference in arrival times of seismic rays following paths $P_3$ and $P_4$ at seismic receiver $R_2$ is $\Delta T_2$.

Finally, FIG. 1C shows a seismic ray path $P_5$ emanating from the source $S_3$ and reflecting from the upper surface 10 of the thin subterranean formation F as well as a seismic ray path $P_6$ emanating from the source $S_3$ and reflecting from the lower surface 12 of the thin subterranean formation F. Both seismic ray paths $P_5$ and $P_6$ are received by seismic receiver $R_3$ which is at a distance $X_m$ from the seismic source $S_3$. The range $X_m$ corresponds to the maximum range or separation between the seismic source S and the seismic receiver R of the common depth point array of seismic sources S and seismic receivers R. The difference in arrival time of seismic rays following paths $P_5$ and $P_6$ at seismic receiver $R_3$ is $\Delta T_3$.

It is noted in looking at FIGS. 1 and 2 that $\Delta T_0 > \Delta T_1 > \Delta T_2 > \Delta T_3$. As such, FIG. 2 shows graphically the apparent thinning of the subterranean formation F as the range X between the seismic source S and the seismic receiver R increases in the common depth point array of seismic sources S and seismic receivers R. An example of such thinning is further shown in an unstacked CDP gather of seismic traces of FIG. 3 which was filtered with a conventional filter having the following bandpass <1, 2, 60, 65 Hz>.

Figure 3:
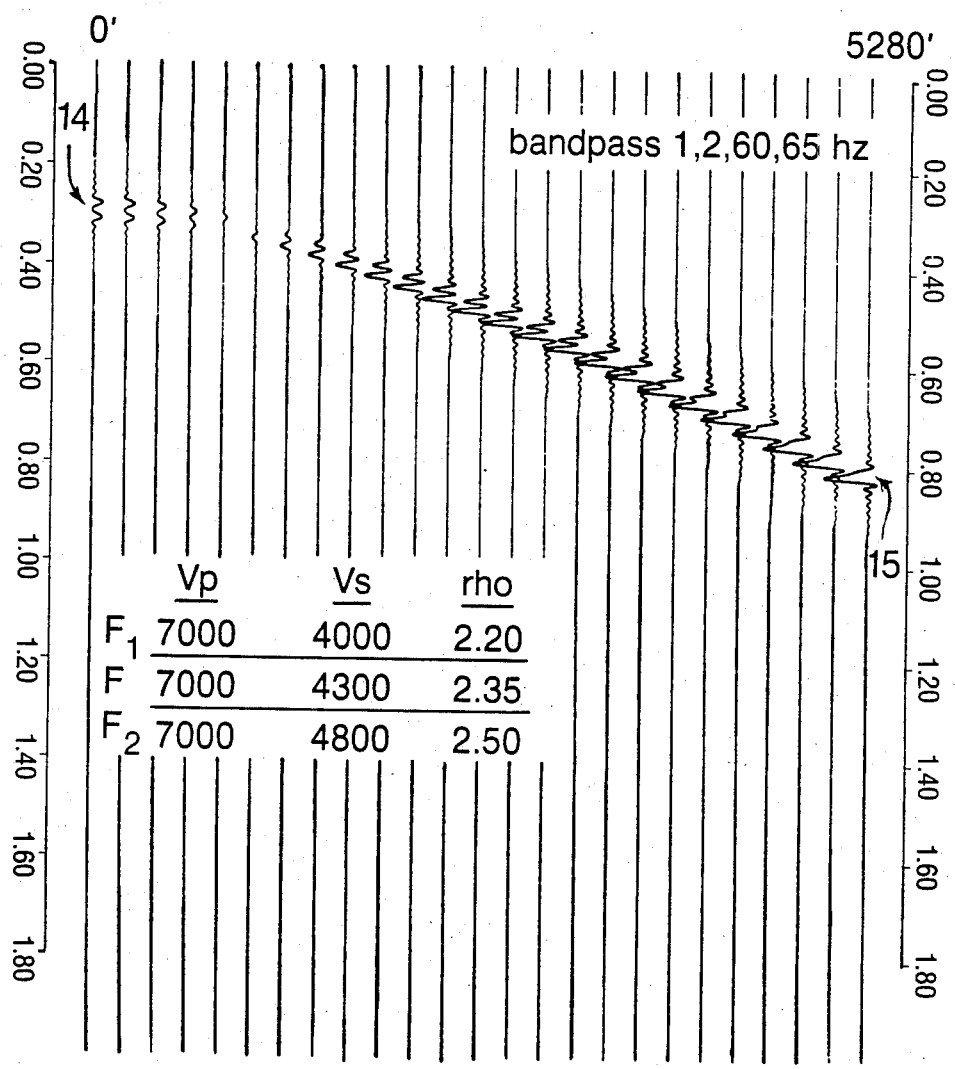
FIG. 3 is a graphical representation of an uncorrected common depth gather of the seismic signals plotted as unstacked common depth point gathers of seismic traces as a function of amplitude, time and range.
Figure 5A:
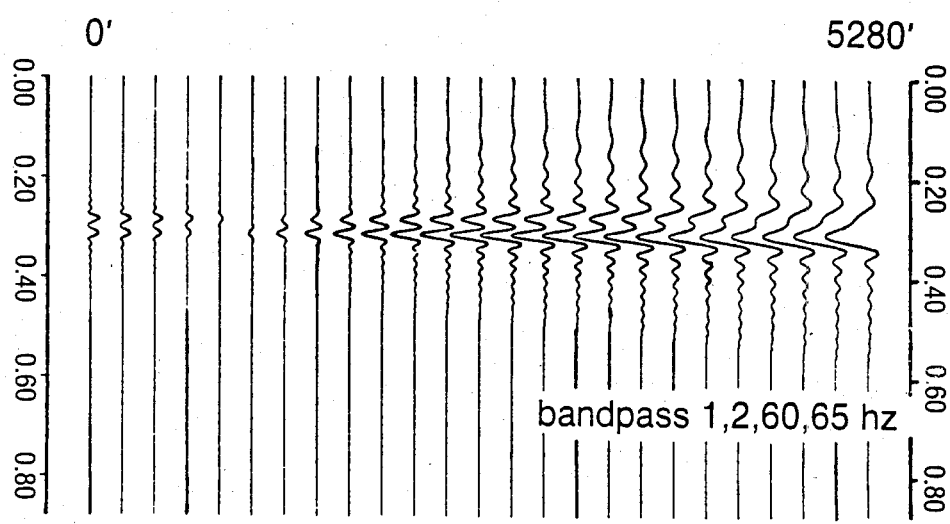
FIG. 5A is a graphical representation of the seismic data of FIG. 3 corrected for normal moveout.

When the seismic data of FIG. 3 are subsequently corrected for normal moveout (NMO) using conventional techniques, as seen in FIG. 5A, not only have the seismic signal wavelets merged, but the frequency content of the seismic traces decreases from left to right because of the unequal stretching of the seismic traces. Therefore, NMO does not correct the situation. Such apparent thinning of the subterranean formation F causes the reflection from the surface 10 and the reflection from surface 12 to interact differently with each other as the range increases. This interaction causes erroneous increases and decreases in the seismic signal due solely to the apparent thinning and is often defined as range dependent tuning. As such, resolution of the true variations of the amplitude of the seismic signals, represented by each seismic trace as a function of range, is clouded.

Moreover, looking at FIG. 3, the range dependent tuning effects upon the seismic data are further exhibited by comparing the progression of the unstacked common depth point gathers of seismic traces at near range (coinciding with the left hand portion of FIG. 3) to those at far range. It can be seen in FIG. 3 that a wavelet at the near range 14 merges into a single wavelet at far range 15. The downward inclination of the unstacked seismic traces across FIG. 3 is the result of the moveout of the seismic wave through the earth's formation, i.e., FIG. 3 shows the unstacked seismic traces without correction for moveout. The insert table in FIG. 3 indicates selected physical properties of formations above ($F_1$) and below ($F_2$) the subterranean formation F as well as for Formation F.

The effects of the aforementioned range dependent tuning can be reduced with a bandpass filter having a bandpass frequency dependent upon the distance X separating the seismic sources S from the seismic receivers R of a common depth point array of seismic sources S and seismic receivers R. Such a bandpass filter balances the frequency resolution of the seismic signal at the near range to that at the far range such that it is possible to resolve true variations of the amplitude of the seismic signals as a function of range. The bandpass filter which will produce this result can be calculated as a function of time and is dependent upon both the maximum range $X_m$ and the stacking velocity profile $V_{ST}$ used for NMO correction.

Figure 4:
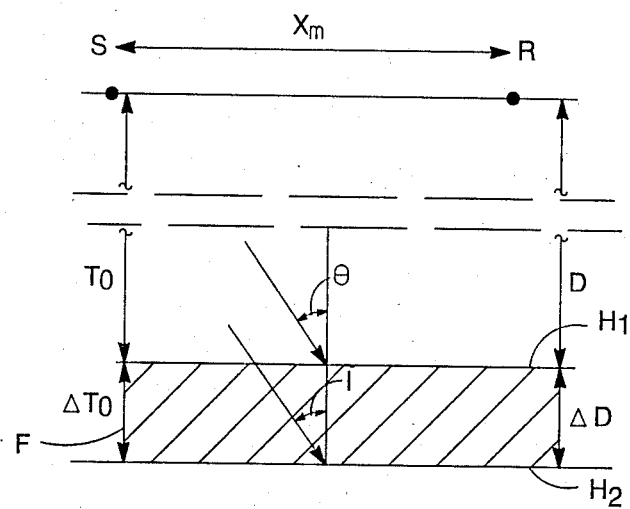
FIG. 4 is a schematic representation showing a correlation between the angle of incidence upon the subterranean formation and a range between seismic source and the seismic receiver.

Looking at FIG. 4, a seismic source S and a seismic receiver R are separated by a maximum range $X_m$. An upper reflecting horizon $H_1$ of subterranean formation F at a depth D is impinged upon by a seismic signal emanating from the seismic source S at an angle of incidence $\theta$ assuming a straight ray approximation. The following equation:

$$\tan(\theta) = X_m / T_0 V_{ST} \quad (1)$$

interrelates the angle of incidence $\theta$ with the maximum range $X_m$ to the stacking velocity $V_{st}$ of the seismic wave at time $T_0$. The time $T_0$ is the propagation time for the seismic wave to make a normal incidence to the depth D and return to the seismic source S.

A second reflecting horizon $H_2$ corresponding to a lower horizon of the subterranean formation F is at a depth D plus $\Delta D$ and has a normal incidence travel time of $T_0$ plus $\Delta T_0$. The seismic ray propagating between the seismic source S and the seismic receiver R impinges upon horizon $H_2$ at an angle of incidence I. The time difference in the two-way ray path lengths of the reflections of the upper horizon $H_1$ and the lower horizon $H_2$ is defined as $\Delta T$. Assuming that $\theta \approx I$ (i.e., $\Delta D$ is small compared to D), we have the following equation:

$$\cos \theta = \Delta T/\Delta T_0 \quad (2)$$

Combining Equations (2) and (1), the resulting equation:

$$\Delta T/\Delta T_0 = \cos [\text{arc tan } (X_m/T_0 V_{ST})] \quad (3)$$

At this point it is possible to invoke the criteria for temporal resolution of a zero phase seismic wavelet consisting of a sinc function where:

$$\Delta T' = 1/1.5 f_m \quad (4)$$

The term $f_m$ equals the maximum frequency of a bandpass sinc wavelet (in our case it is also the maximum frequency in the seismic data) and $\Delta T'$ is the minimum resolvable time thickness for a zero phase sinc wavelet. Kallweit, R. S. and Wood, L. C., The Limits of Resolution of Zero Phase Wavelets, *Geophysics*, vol. 47, 1982, p. 1035.

At the maximum range $X_m$, the minimum resolvable thickness is determined by the maximum bandpass frequency of the recorded data. Since it is desired to determine the minimum time thickness for a thin subterranean formation, we set $\Delta T'$ equal to $\Delta T_0$, the minimum resolvable time thickness, to find the maximum frequency $F_m$ to obtain:

$$F_m = 1/1.5 \Delta T_0 \quad (5)$$

By combining Equations (3), (4), and (5) we obtain:

$$F_m = f_m \cos [\text{arc tan } (X_m/T_0 V_{ST})] \quad (6)$$

At this point, it can be seen that we have developed a bandpass frequency which is dependent upon both the separation between the seismic source S and the seismic receiver R, i.e., range X, as well as the stacking velocity $V_{ST}$, the two way normal incidence time $T_0$ and the maximum frequency $f_m$ of the seismic data. Therefore, the bandpass frequency for each unstacked common depth point gather of seismic traces can be determined as a function of the separation between the seismic source S and the seismic receiver R in the common depth point array of seismic sources S and seismic receivers R. As such, a bandpass filter having a bandpass frequency of $F_m$ will reduce the frequency content of the unstacked CDP gather of seismic traces at all separations to the level of the unstacked NMO corrected CDP gather of seismic traces received at the maximum separation $X_m$.

In order to develop a practical bandpass filter to correct range dependent tuning effects, it is necessary to have a time varying bandpass frequency $F_m(t)$ having both time varying stacking velocity $V_{ST}(t)$ and time varying range $X_m(t)$, as shown in Equation (7).

$$F_m(t) = f_m \cos [\text{arc tan } (X_m(t)/T_0 V_{ST}(t))] \quad (7)$$

Equation (7) now gives the maximum frequency $F_m(t)$ for a sinc function bandpass filter which will reduce the frequency content of a seismic trace at the near range to that at the far range for a common depth point. In the preferred embodiment of the invention, the bandpass filtering operation is performed after the data has been corrected for normal moveout.

Figure 5B:
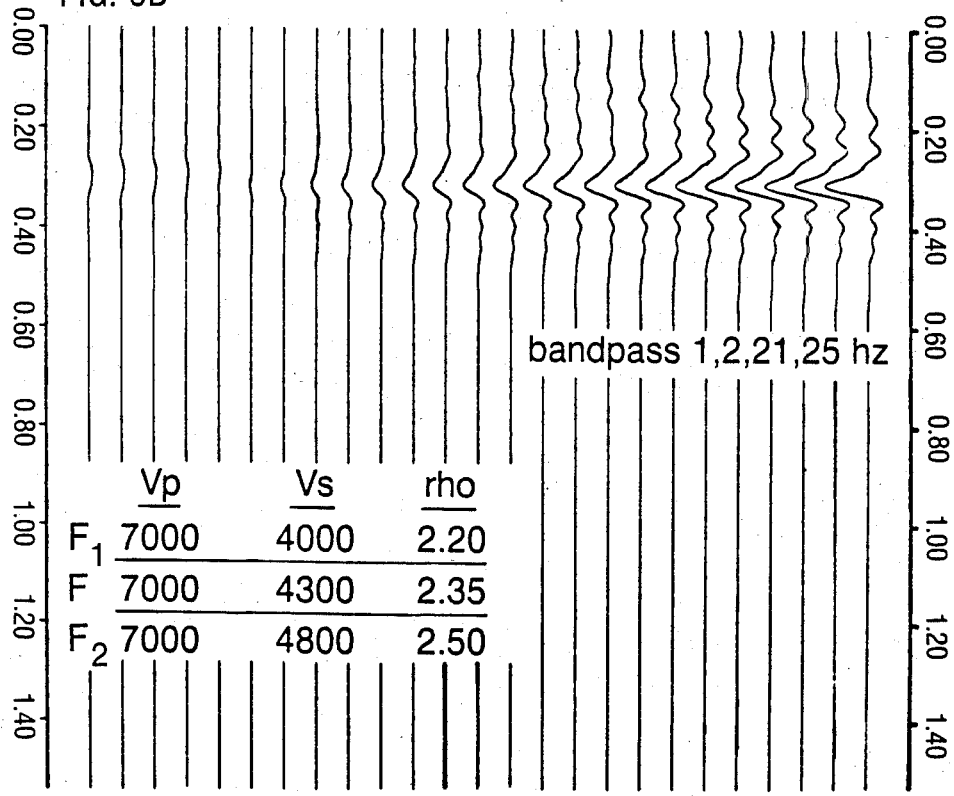
FIG. 5B is a graphical representation of the seismic data of FIG. 3 corrected for normal moveout and corrected for range dependent tuning effects.

Looking at FIG. 5A, the seismic traces originally portrayed in FIG. 3 have been NMO corrected and conventionally filtered. While FIG. 5B shows the results of impressing the bandpass filter of equation 7 upon the seismic traces of FIG. 5A. After NMO corrections, the bandpass filter of the present invention has the effect of lowering the frequency content of the near range seismic traces to that of the far range seismic traces, as shown in FIG. 5B. The bandpass filter deployed in FIG. 5B had the following bandpass frequency characteristics <1, 2, 21, 25 Hz>. As a consequence, resolution of the range dependent variations in the amplitude of the seismic signals are clearly enhanced.

Equation (7), however, is limited by the parallel ray approximation and will thus specify a slightly higher bandpass frequency $F_m(t)$ than would be obtained with a ray tracing algorithm. Range dependent tuning effects will therefore be reduced but not totally removed. One must also keep in mind that other range dependent interference effects such as multiples, crossing moveout curves, etc., that may be observed on seismic data will not be corrected by this technique.

If the interval velocity $V_i$ of subterranean formation F is known, it is possible to obtain a better estimate of the incidence angle $\theta$ from Snell's law:

$$P = \sin \theta_i / V_i = \Delta T/\Delta T \quad (8)$$

where P is the wave parameter, $\Delta T$ is the one-way travel interval along ray path within the event interval layer and $\Delta X$ is the horizontal distance travel by the ray within the interval. The wave parameter P may then be expressed in terms of the normal moveout formula:

$$T_X = \left( T_0^2 + \frac{X^2}{V_{ST}^2} \right)^{\frac{1}{2}} \quad (9)$$

Taking the derivative of the normal moveout formula of Equation (9) with respect to the range:

$$p = \Delta T/\Delta X = dT_X/dX = X/V_{ST}^2 T_X \quad (10)$$

or, in terms of $T_0$ $$P = \frac{X}{V_{ST}^2 \left( T_0^2 + \frac{X^2}{V_{ST}^2} \right)^{\frac{1}{2}}} \quad (11)$$

The angle of incidence is then $$\theta = \arcsin \left[ \frac{X V_i}{V_{ST}^2 \left( T_0^2 + \frac{X^2}{V_{ST}^2} \right)^{\frac{1}{2}}} \right] \quad (12)$$

Expression 7 then becomes the more accurate equation for the frequency as a function of time $$F_m(t) = f_m \cos\left[\arcsin\left[\frac{X_m(t) V_i(t)}{V_{ST}^2(t)}\left(T_0^2 + \frac{X_m^2(t)}{V_{ST}^2(t)}\right)^{-\frac{1}{2}}\right]\right] \quad (13)$$

Figure 6:
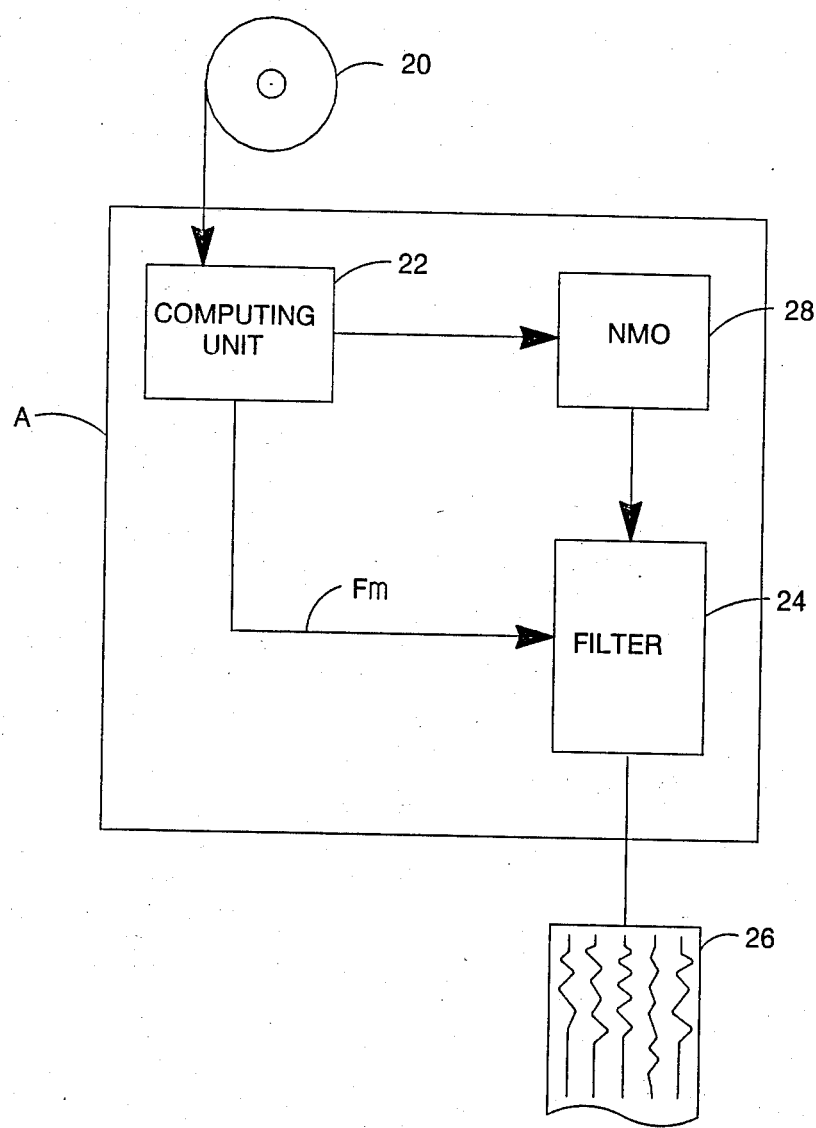
FIG. 6 is a schematic of the apparatus of the present invention.

Now, looking at FIG. 6, the range dependent tuning apparatus of the present invention is shown. The range dependent tuning apparatus is generally indicated by the letter A. The seismic response data generated by a plurality of seismic sources S and seismic receivers R are collected on a magnetic tape 20 using conventional seismic exploration techniques. The seismic response data received by the seismic receivers contain both amplitude vs time data as well as header information specifying the separation distance X between a seismic source S and a seismic receiver R in a common depth point array of seismic sources S and seismic receivers R.

Logically, the seismic response data collection on tape 20 is input to a computing unit 22 of the range dependent tuning apparatus A to sort the seismic signals comprising the seismic response data into unstacked CDP gathers and to determine the maximum bandpass frequency $F_m$ in accordance with Equations (6), (7) or (13) for each common depth point array of seismic sources S and seismic receivers R. The bandpass frequency $F_m$ is calculated utilizing the header data contained in magnetic tape 20. In the preferred embodiment, the maximum bandpass frequency is determined as a result of the calculation from the Equation (13). The bandpass frequency $F_m$ so determined is communicated to a bandpass filter 24. The bandpass filter 24 is one of the type having a selectable bandpass frequency cutoff.

Having determined the bandpass frequency $F_m$ for the bandpass filter 24, the bandpass filter 24 impresses the determined bandpass frequency $F_m$ on the unstacked NMO corrected CDP gathers of the recorded seismic response data from tape 20. Once the seismic data has been impressed with the bandpass frequency of filter 24, it is output for a plotter 26 to produce a conventional seismic trace corrected for range dependent tuning effects as shown in FIG. 5B. The seismic response data is first processed for normal moveout correction prior to having the bandpass frequency $F_m$ impressed by bandpass filter 24. As such, the range dependent tuning apparatus A further includes a normal moveout correction processor 28 to correct the seismic response data for NMO prior to impressing the bandpass frequency $F_m$ of bandpass filter 24.

Having made this disclosure, other refinements and modifications thereto will be appreciated by those skilled in the art and are comprehended within the scope of the disclosure contained herein.

We claim:

1. A method of seismic exploration including acquiring seismic response data from seismic signals generated by a plurality of seismic sources and seismic receivers having at least one dimension for resolving seismic signal amplitude variations as a function of range comprising the steps of:
   sorting the seismic response data into unstacked common depth point gathers of seismic signals;
   specifying range separating each seismic source and each seismic receiver in a common depth point array of seismic sources and seismic receivers;
   impressing a bandpass filter upon the seismic signal from each seismic receiver having a bandpass frequency dependent upon the range separating one seismic receiver from the seismic source initiating the seismic signal in a common depth point array to resolve seismic signal amplitude variations as a function of range in a common depth point gather of seismic signals.

2. The method of claim 1 wherein the bandpass filter frequency is dependent upon the maximum range separating seismic receivers and seismic sources in a common depth point array of seismic receivers and seismic sources.

3. The method of claim 1 wherein the bandpass frequency is dependent upon the seismic response signal stacking velocity.

4. The method of claim 3 wherein the bandpass frequency is determined according to:

$$F_m = f_m \cos\left[\arctan\left(X_m/T_0 V_{ST}\right)\right]$$

where $f_m$ is the maximum frequency of a bandpass sinc wavelet; $X_m$ is the maximum range separating the seismic source and one of the receivers; $T_0$ is the normal incidence time for a seismic wave to propagate to a depth D and return; and $V_{ST}$ is the stacking velocity.

5. The method of claim 1 wherein the bandpass frequency is determined according to:

$$F_m(t) = f_m \cos\left[\arctan\left(X_m(t)/T_0 V_{ST}(t)\right)\right]$$

where:
   $f_m$ is the maximum frequency the bandpass sinc wavelet;
   $X_m(t)$ is a time varying maximum range separating seismic source and receiver;
   $V_{ST}(t)$ is a time varying stacking velocity; and
   $T_0$ is a variable two way time of propagation of a seismic wave to depth D.

6. The method of claim 1 wherein the bandpass frequency is determined according to:

$$F_m(t) = f_m \cos\left[\arcsin\left[\frac{X_m(t) V_i(t)}{V_{ST}^2(t)}\left(T_0^2 + \frac{X_m^2(t)}{V_{ST}^2(t)}\right)^{-\frac{1}{2}}\right]\right]$$

where:
   $f_m$ is the maximum frequency the bandpass sinc wavelet;
   $X_m(t)$ is a time varying maximum range separating seismic source and receiver;
   $V_i(t)$ is a time varying interval velocity;
   $V_{ST}(t)$ is a time varying stacking velocity; and
   $T_0$ is a variable two way time of propagation of a seismic wave to a time varying depth D.

7. An apparatus to enhance the resolution of seismic signal amplitude variations as a function of range comprising:
   means for receiving seismic response data including seismic signals generated from a plurality of seismic receivers and seismic sources;
   means for determining range separating seismic sources and seismic receivers in common depth point arrays of seismic sources and seismic receivers;

computing means for sorting the seismic signals into common depth point gathers and for determining a bandpass frequency dependent upon the range separating one seismic receiver and one seismic source initiating the seismic signal in the common depth point array of seismic sources and seismic receivers; and selectable filtration means having a bandpass frequency determined by said computing means for impressing said bandpass frequency upon each common depth point gather of the seismic signals.

8. The apparatus of claim 7 further including:
computing means for determining a time varying bandpass frequency dependent upon the range separating each seismic receiver and the seismic source.

9. The apparatus of claim 7 further including:
means for determining a maximum bandpass frequency dependent upon the maximum range separating the seismic receivers and the seismic source of a common depth point array of seismic sources and seismic receivers.

10. The apparatus of claim 7 further including:
output means for plotting seismic traces from the seismic signals having been impressed with said bandpass frequency by said selectable filtration means.

11. A method of seismic exploration including acquiring seismic response data from seismic signals generated by a plurality of seismic sources and seismic receivers having at least one dimension so as to resolve amplitude variations as a function of range of seismic signals of a common depth point gather comprising the steps of:
sorting the seismic signals into unstacked common depth point gathers;
normal moveout correcting the seismic signals; and
balancing frequency content of the normal moveout corrected seismic signals of common depth point gathers by impressing a bandpass filter upon the normal moveout corrected seismic signals having a bandpass frequency dependent upon maximum range separating seismic sources from seismic receivers in a common depth point array.

12. The method of claim 11 wherein the step of balancing frequency content further includes impressing a bandpass filter upon the normal moveout corrected seismic signals having a bandpass frequency dependent upon maximum frequency content of the seismic response data.

13. The method of claim 11 wherein the step of balancing frequency content further includes impressing a bandpass filter upon the normal moveout corrected seismic signals having a frequency dependent upon the stacking velocity for normal moveout correction.

14. The method of claim 11 wherein the bandpass frequency is determined according to:

$$F_m = f_m \cos [\arctan (X_m/T_0 V_{ST})]$$

where:
$f_m$ is the maximum frequency of a bandpass sinc wavelet;
$X_m$ is the maximum range separating the seismic source and one of the receivers;
$T_0$ is the normal incidence time for a seismic wave to propagate to a depth D and return; and
$V_{ST}$ is the stacking velocity.

15. The method of claim 11 wherein the bandpass frequency is determined according to:

$$F_m(t) = f_m \cos [\arctan (X_m(t)/T_0 V_{ST}(t))]$$

where:
$f_m$ is the maximum frequency the bandpass sinc wavelet;
$X_m(t)$ is a time varying maximum range separating seismic source and receiver;
$V_{ST}(t)$ is a time varying stacking velocity; and
$T_0$ is a variable two way time of propagation of a seismic wave to depth D.

16. The method of claim 11 wherein the bandpass frequency is determined according to:

$$F_m(t) = f_m \cos \left[ \arcsin \left[ \frac{X_m(t) \, V_i(t)}{V_{ST}^2(t)} \left( T_0^2 + \frac{X_m^2(t)}{V_{ST}^2(t)} \right)^{-\frac{1}{2}} \right] \right]$$

where:
$f_m$ is the maximum frequency the bandpass sinc wavelet;
$X_m(t)$ is a time varying maximum range separating seismic source and receiver;
$V_i(t)$ is a time varying interval velocity;
$V_{ST}(t)$ is a time varying stacking velocity; and
$T_0$ is a variable two way time of propagation of a seismic wave to a time varying depth D.

17. The apparatus of claim 7 wherein the bandpass frequency is dependent upon the maximum range separating seismic receivers and sources in the common depth point array of seismic sources and seismic receivers.

18. The apparatus of claim 7 wherein the bandpass frequency is determined according to:

$$F_m = f_m \cos [\arctan (X_m/T_0 V_{ST})]$$

where:
$f_m$ is the maximum frequency of a bandpass sinc wavelet;
$X_m$ is the maximum range separating the seismic source and one of the receivers;
$T_0$ is the normal incidence time for a seismic wave to propagate to a depth D and return; and
$V_{ST}$ is the stacking velocity.

19. The apparatus of claim 7 wherein the bandpass frequency is determined according to:

$$F_m(t) = f_m \cos [\arctan (X_m(t)/T_0 V_{ST}(t))]$$

where:
$f_m$ is the maximum frequency the bandpass sinc wavelet;
$X_m(t)$ is a time varying maximum range separating seismic source and receiver;
$V_{ST}(t)$ is a time varying stacking velocity; and
$T_0$ is a variable two way time of propagation of a seismic wave to depth D.

20. The apparatus of claim 7 wherein the bandpass frequency is determined according to:

$$F_m(t) = f_m \cos\left[\arcsin\left[\frac{X_m(t) V_i(t)}{V_{ST}^2(t)}\left(T_0^2 + \frac{X_m^2(t)}{V_{ST}^2(t)}\right)^{-\frac{1}{2}}\right]\right]$$

where:

$f_m$ is the maximum frequency the bandpass sinc wavelet;

$X_m(t)$ is a time varying maximum range separating seismic source and receiver;

$V_i(t)$ is a time varying interval velocity;

$V_{ST}(t)$ is a time varying stacking velocity; and $T_0$ is a variable two way time of propagation of a seismic wave to a time varying depth D.

* * * * *

UNITED STATES PATENT OFFICE
CERTIFICATE OF CORRECTION

PATENT NO. : 4,628,491
DATED : December 9, 1986
INVENTOR(S) : John H. Bodine et al.

It is certified that error appears in the above-identified patent and that said Letters Patent are hereby corrected as shown below:

Column 1, line 18-19 "formation" should read --formations--.

Column 5, line 18, "$\Delta T$" should read --$\Delta T'$--.

Column 6, line 33 (formula #8), "$\frac{\Delta T}{\Delta T}$" should read --$\frac{\Delta T}{\Delta X}$--.

Column 6, line 48 (formula #10), "p=" should read --P=--.

Signed and Sealed this

Twenty-first Day of June, 1988

*Attest:*

DONALD J. QUIGG

*Attesting Officer*     *Commissioner of Patents and Trademarks*